(12) United States Patent
Kenmotsu

(10) Patent No.: US 10,698,641 B2
(45) Date of Patent: *Jun. 30, 2020

(54) IMAGE FORMING APPARATUS AND OPERATION MODE SETTING METHOD

(71) Applicant: TOSHIBA TEC KABUSHIKI KAISHA, Shinagawa-ku, Tokyo (JP)

(72) Inventor: Takahide Kenmotsu, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,977

(22) Filed: Jul. 9, 2019

(65) Prior Publication Data

US 2020/0012463 A1 Jan. 9, 2020

Related U.S. Application Data

(63) Continuation of application No. 16/028,722, filed on Jul. 6, 2018, now Pat. No. 10,353,651.

(51) Int. Cl.
*G06F 3/12* (2006.01)
*H04N 1/00* (2006.01)

(52) U.S. Cl.
CPC .......... *G06F 3/1221* (2013.01); *G06F 3/1217* (2013.01); *G06F 3/1231* (2013.01); *H04N 1/00641* (2013.01)

(58) Field of Classification Search
None
See application file for complete search history.

(56) References Cited

U.S. PATENT DOCUMENTS

| 6,678,482 | B2 * | 1/2004 | Masuda | H04N 1/295 399/12 |
| 6,904,242 | B2 | 6/2005 | Ito et al. | |
| 7,177,553 | B2 | 2/2007 | Ono | |
| 2010/0268591 | A1 * | 10/2010 | Gnanasambandam | G06F 3/1203 705/14.37 |
| 2013/0088740 | A1 * | 4/2013 | Nishimura | G03G 15/0863 358/1.14 |
| 2018/0022104 | A1 * | 1/2018 | Bonneton | G06F 21/123 347/86 |

OTHER PUBLICATIONS

Non-Final Office Action on U.S. Appl. No. 16/028,722 dated Sep. 20, 2018.
Notice of Allowance on U.S. Appl. No. 16/028,722 dated Mar. 6, 2019.

* cited by examiner

*Primary Examiner* — Frantz Bataille
(74) *Attorney, Agent, or Firm* — Foley & Lardner LLP

(57) ABSTRACT

An image forming apparatus includes a read-out unit, a memory unit, and a processor. The read-out unit reads out first collation information from an exchange product which is mounted in the image forming apparatus. The memory unit stores second collation information. The processor detects a power supply or a sleep return, compares the first collation information with the second collation information based on detection of the power supply or the sleep return, and sets an operation mode based on a comparison result of the first collation information with the second collation information.

13 Claims, 3 Drawing Sheets

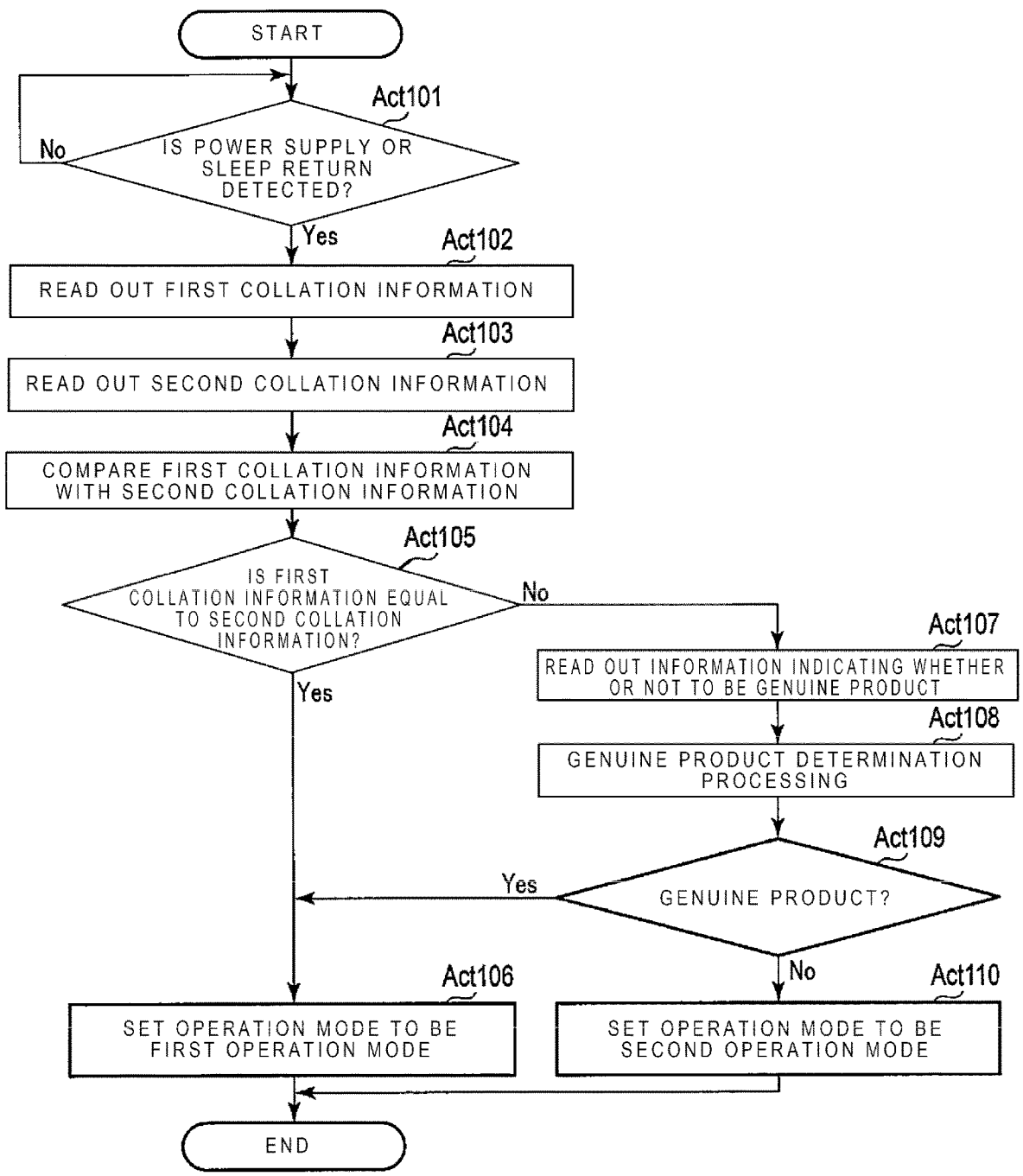

IMAGE FORMING APPARATUS AND OPERATION MODE SETTING METHOD

CROSS-REFERENCE TO RELATED APPLICATIONS

The present application is a continuation of U.S. patent application Ser. No. 16/028,722 filed Jul. 6, 2018, to be issued as U.S. Pat. No. 10,353,651 on Jul. 16, 2019, the entire disclosure of which is incorporated herein by reference.

FIELD

Embodiments described herein relate generally to an image forming apparatus and an operation mode setting method.

BACKGROUND

In the related art, an image forming apparatus automatically determines whether or not a toner cartridge which is mounted in the image forming apparatus is a genuine product. The image forming apparatus reads out information indicating whether or not to be a genuine product from the toner cartridge, and determines whether or not the toner cartridge is the genuine product. If the toner cartridge is not the genuine product, the image forming apparatus adopts a technology for prohibiting an image forming operation or for displaying a warning.

However, the image forming apparatus determines whether or not the toner cartridge is the genuine product every time at the time of a startup or a sleep return. Therefore, the image forming apparatus asks for a long time up to a paper passing start from after the startup or the sleep return.

DESCRIPTION OF THE DRAWINGS

FIG. 3 is a flowchart illustrating setting processing of an operation mode in the image forming apparatus according to at least one embodiment.

DETAILED DESCRIPTION

In general, according to at least one embodiment, there is provided an image forming apparatus including a read-out unit, a memory unit, and a processor. The read-out unit reads out first collation information from an exchange product which is mounted in the image forming apparatus. The memory unit stores second collation information. The processor detects a power supply or a sleep return, compares the first collation information with the second collation information based on detection of the power supply or the sleep return, and sets an operation mode based on a comparison result of the first collation information with the second collation information.

Hereinafter, certain embodiments will be described with reference to the drawings.

A configuration of the image forming apparatus according to certain embodiments will be described.

Figure 1:
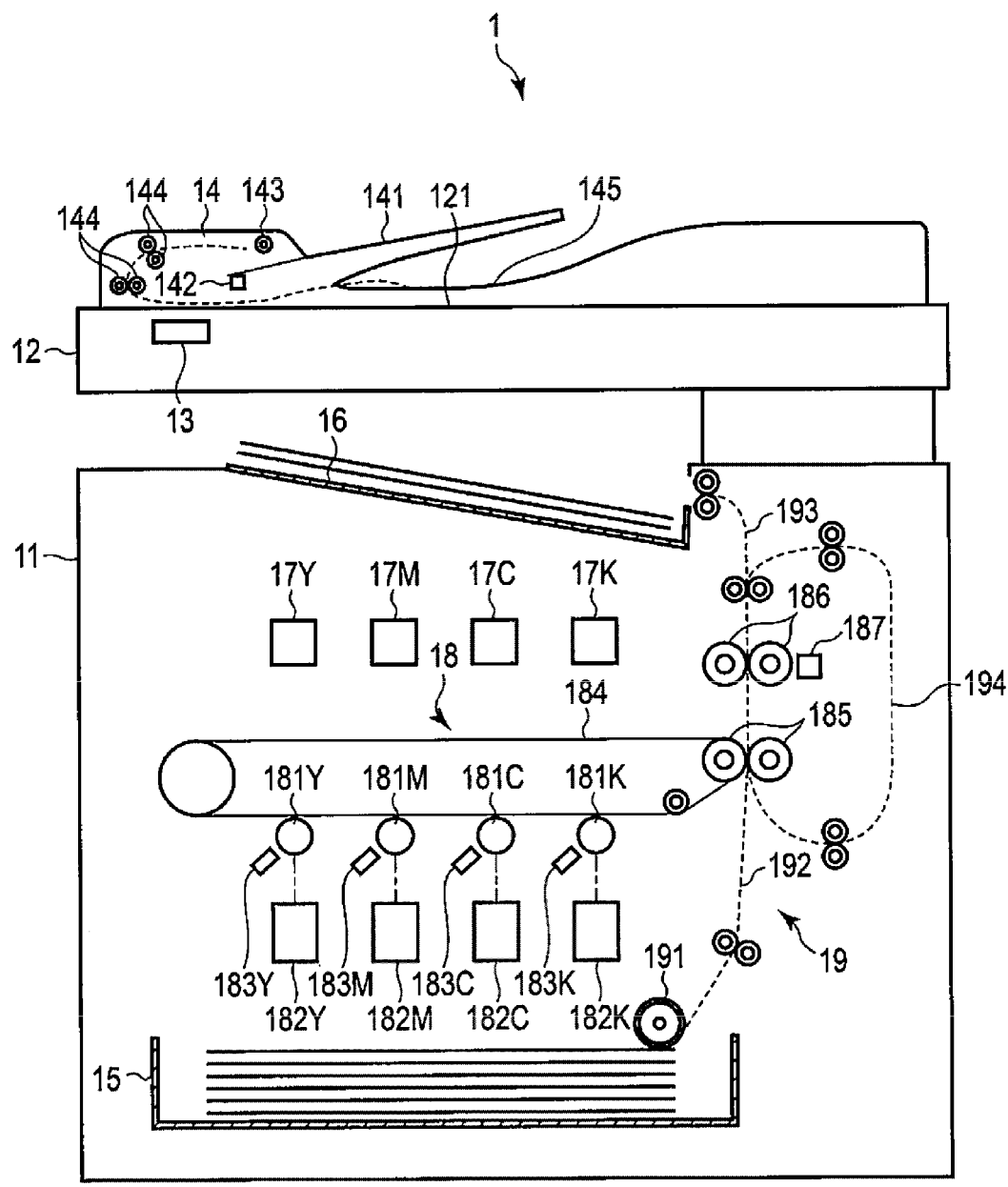
FIG. 1 is a schematic diagram illustrating an image forming apparatus according to at least one embodiment.

FIG. 1 is a schematic diagram illustrating an image forming apparatus 1. The image forming apparatus 1 is an apparatus that executes various processing such as image formation while carrying a recording medium. For example, the image forming apparatus 1 may be a multi function peripheral (MFP).

The image forming apparatus 1 includes a housing 11, an original document table 12, a scanner unit 13, an ADF device 14, a paper feeding cassette 15, a paper discharge tray 16, toner cartridges 17C, 17M, 17Y and 17K, an image forming unit 18, and a carrying unit 19.

The housing 11 is a main body that retains the original document table 12, the scanner unit 13, the ADF device 14, the paper feeding cassette 15, the paper discharge tray 16, the toner cartridges 17C, 17M, 17Y and 17K, the image forming unit 18, and the carrying unit 19.

The original document table 12 is a member on which an original document is placed. The original document table 12 includes a glass plate 121. The original document is placed on the glass plate 121.

The scanner unit 13 is a member that takes in image data from the original document. The scanner unit 13 is disposed in an internal space of the original document table 12. The scanner unit 13 includes an image sensor, an optical element, lighting, and the like which are not illustrated in the drawing. The image sensor is an image pickup element in which pixels for converting light into an electric signal (image signal) are arrayed into a line shape. For example, the image sensor is formed of a charge coupled device (CCD), a complementary metal oxide semiconductor (CMOS), or other image pickup elements. The optical element is a member that causes the light from a predetermined reading range to form an image on the pixels of the image sensor. The reading range of the optical element is a line-shaped region on the glass plate 121. The optical element causes the light that is reflected by the original document which is placed on the glass plate 121, and is transmitted through the glass plate 121 to form the image on the pixels of the image sensor. The lighting irradiates the original document on the glass plate 121 with the light. The lighting includes a light source, and a light guide body that irradiates the original document with the light from the light source. The lighting irradiates a region including the reading range of the optical element with the light which is emitted from the light source by the light guide body.

The scanner unit 13 is driven by a drive mechanism that is not illustrated in the drawing in a sub-scanning direction which is orthogonal to an array direction (main scanning direction) of the pixels of the image sensor. The scanner unit 13 is driven in the sub-scanning direction, and obtains the image data of the whole original document that is placed on the glass plate 121 by continuously obtaining the images one line by one line with the image sensor.

The ADF device 14 is a mechanism that continuously carries the original documents one sheet by one sheet to a position which is an opposite side to a position of the scanner unit 13 on the glass plate 121. The ADF device 14 is provided to be freely opened and closed on the original document table 12. The ADF device 14 is an example of an original document reading device.

The ADF device 14 includes an original document tray 141, a sensor 142, an original document sending roller 143, a plurality of carrying rollers 144, and an original document discharge tray 145. The original document tray 141 is a table for placing the original document which is desired to be taken in the ADF device 14 thereon. The original document tray 141 accommodates the original document. The original document tray 141 is configured to be movable between a first position and a second position. The first position is a home position. The second position is a position at which the original document sending roller 143 described later is capable of taking in the original documents that are set on the original document tray 141 one sheet by one sheet to the ADF device 14. The sensor 142 detects that the original document is set at a predetermined position of the original document tray 141. The original document sending roller 143 rotates by an operation of a motor which is not illustrated in the drawing, and carries the original document which is set on the original document tray 141. Thereby, the original document sending roller 143 takes in the original documents one sheet by one sheet to the ADF device 14. The plurality of carrying rollers 144 carry the original documents one sheet by one sheet to the position which is the opposite side to the position of the scanner unit 13 on a surface of the glass plate 121, and discharge the original document to the original document discharge tray 145. Thereby, the scanner unit 13 is capable of continuously obtaining the images one line by one line from the original document which is carried by the ADF device 14, and obtaining the image data of the whole original document. The original document discharge tray 145 is a table on which the original documents which are carried by the plurality of carrying rollers 144 in the ADF device 14 are discharged.

The paper feeding cassette 15 is a cassette that accommodates a printing medium. The paper feeding cassette 15 is configured to be capable of supplying the printing medium from an outside of the housing 11. The paper feeding cassette 15 is configured to be capable of being pulled out from the housing 11.

The paper discharge tray 16 is a tray that supports the printing medium which is discharged from the image forming apparatus 1.

The toner cartridge 17C accommodates a cyan toner. The toner cartridge 17C is attachable to and detachable from the image forming apparatus 1. The toner cartridge 17C supplies the toner to a developing device 183C which will be described later. The toner cartridge 17M accommodates a magenta toner. The toner cartridge 17M is attachable to and detachable from the image forming apparatus 1. The toner cartridge 17M supplies the toner to a developing device 183M which will be described later. The toner cartridge 17Y accommodates a yellow toner. The toner cartridge 17Y is attachable to and detachable from the image forming apparatus 1. The toner cartridge 17Y supplies the toner to a developing device 183Y which will be described later. The toner cartridge 17K accommodates a black toner. The toner cartridge 17K is attachable to and detachable from the image forming apparatus 1. The toner cartridge 17K supplies the toner to a developing device 183K which will be described later.

The image forming unit 18 is a printer that forms the image on the printing medium. The image forming unit 18 includes drums 181C, 181M, 181Y and 181K, light sources 182C, 182M, 182Y and 182K, developing devices 183C, 183M, 183Y and 183K, a transfer belt 184, a pair of transfer rollers 185, a pair of fixing rollers 186, and a heat fixing load 187. The drum 181C, the light source 182C, and the developing device 183C are a group of members relating to cyan image formation. The drum 181M, the light source 182M, and the developing device 183M are a group of members relating to magenta image formation. The drum 181Y, the light source 182Y, and the developing device 183Y are a group of members relating to yellow image formation. The drum 181K, the light source 182K, and the developing device 183K are a group of members relating to black image formation.

The drum 181C is a photosensitive drum that is formed into a cylinder shape. The drum 181C is provided to be in contact with the transfer belt 184. A surface of the drum 181C is evenly electrified by an electrification charger which is not illustrated in the drawing. The drum 181C rotates at a fixed speed by the drive mechanism which is not illustrated in the drawing. The drum 181C is an example of a photoreceptor. Since each of the drums 181M, 181Y and 181K is configured in the same manner as the drum 181C, the description thereof will be omitted.

The light source 182C is a member that exposes the drum 181C to the light in accordance with the electric signal (image signal) of the image data. The light source 182C emits the light of a wavelength which is capable of forming a latent image to the electrified drum 181C, and an electrostatic latent image is formed on the electrified drum 181C. Since each of the light sources 182M, 182Y and 182K is configured in the same manner as the light source 182C, the description thereof will be omitted.

The developing device 183C attaches the toner to the electrostatic latent image which is formed on the drum 181C. Thereby, the developing device 183C forms a toner image on the surface of the drum 181C. Since each of the developing devices 183M, 183Y and 183K is configured in the same manner as the developing device 183C, the description thereof will be omitted.

The transfer belt 184 is a member for receiving the toner images which are formed on the surfaces of the drums 181C, 181M, 181Y and 181K, and for transferring the toner images to the printing medium. The transfer belt 184 is moved by a rotation of a roller which is not illustrated in the drawing. The transfer belt 184 receives the toner image that is formed on the drum 181C at a position which is in contact with the drum 181C, and transports the received toner image to the pair of transfer rollers 185. In the same manner, the transfer belt 184 receives the toner images which are formed on the drums 181M, 181Y and 181K, and transports the received toner images to the pair of transfer rollers 185.

The pair of transfer rollers 185 is configured to interpose the transfer belt 184 and the printing medium between the pair of transfer rollers 185. The pair of transfer rollers 185 transfers the toner image on the transfer belt 184 to the printing medium.

The pair of fixing rollers 186 is configured to interpose the printing medium therebetween. The pair of fixing rollers 186 is heated by the heat fixing load 187 described later. The pair of fixing rollers 186 fixes the toner image which is formed on the printing medium by applying pressure to the interposed printing medium, in a heated state. Thereby, the pair of fixing rollers 186 forms the image on the printing medium, by fixing the toner image on the printing medium.

The heat fixing load 187 is a heater that heats the pair of fixing rollers 186. The heat fixing load 187 is disposed in the vicinity of the pair of fixing rollers 186. For example, the heat fixing load 187 is formed of a metal that generates the heat by an electromagnetic wave.

The carrying unit 19 carries the printing medium within the image forming apparatus 1. The carrying unit 19 includes a take-in roller 191, a paper feeding carrying path 192, a paper discharge carrying path 193, and a reverse carrying path 194. The take-in roller 191 takes in the printing medium which is accommodated in the paper feeding cassette 15 to the paper feeding carrying path 192 described later. The take-in roller 191 rotates in accordance with the operation of the motor. The paper feeding carrying path 192 is a carrying path for carrying the printing medium which is taken in from the paper feeding cassette 15 by the take-in roller 191 to the image forming unit 18. The paper feeding carrying path 192 is formed of a plurality of guides and a plurality of rollers. The plurality of rollers which form the paper feeding carrying path 192, rotate in accordance with the operation of the motor. The paper discharge carrying path 193 is a carrying path for discharging the printing medium on which the image is formed by the image forming unit 18 from the housing 11. The printing medium is discharged onto the paper discharge tray 16 by the paper discharge carrying path 193. The paper discharge carrying path 193 is formed of a plurality of guides and a plurality of rollers. The plurality of rollers which form the paper discharge carrying path 193, rotate in accordance with the operation of the motor. The reverse carrying path 194 is a carrying path for supplying the printing medium again to the image forming unit 18, in a state where a surface and a rear surface, a front and a rear, and the like of the printing medium on which the image is formed by the image forming unit 18 are reversed. The reverse carrying path 194 is formed of a plurality of guides and a plurality of rollers. The plurality of rollers which form the reverse carrying path 194, rotate in accordance with the operation of the motor.

Figure 2:
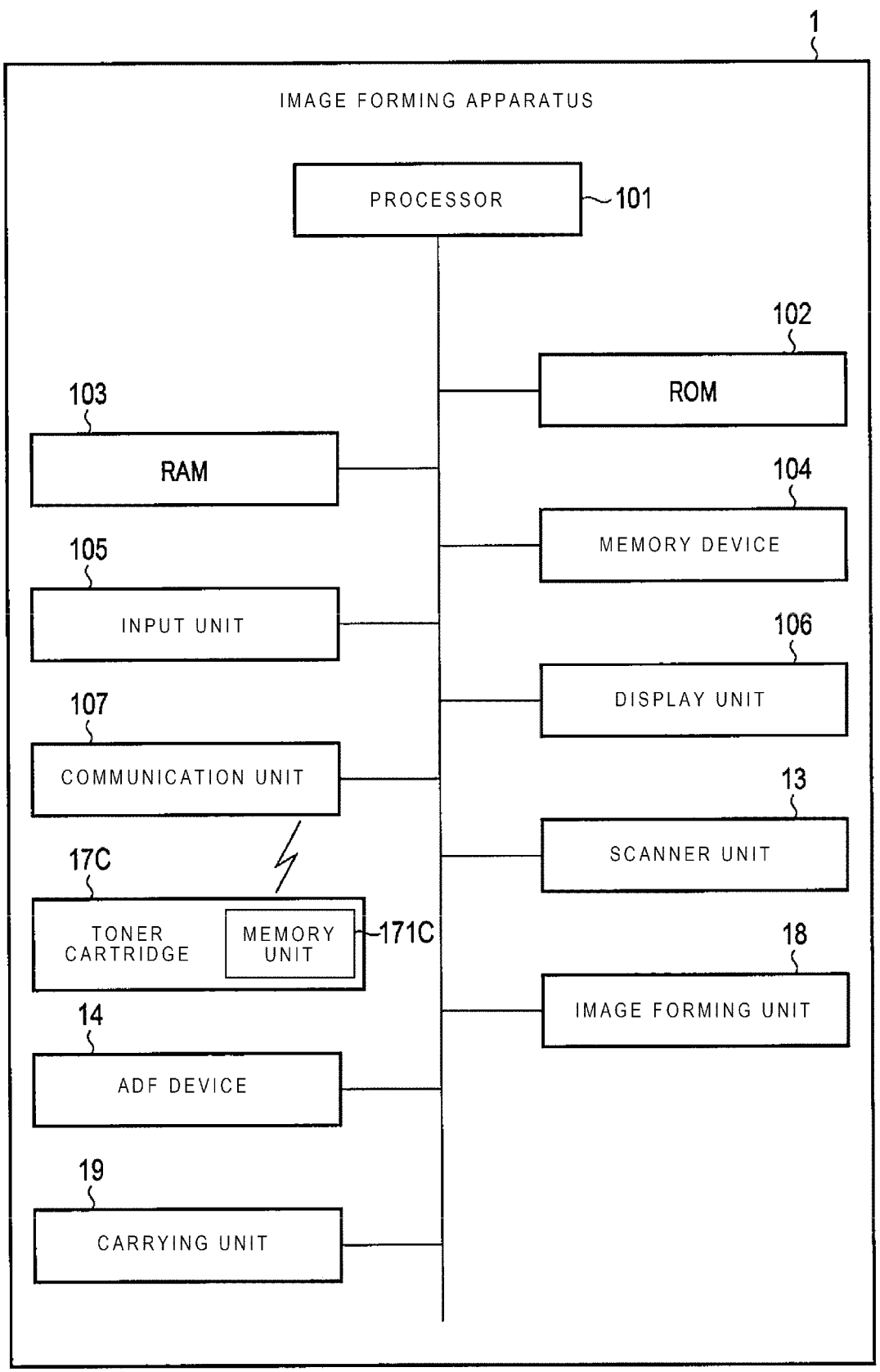
FIG. 2 is a block diagram illustrating a hardware configuration of the image forming apparatus according to at least one embodiment.

FIG. 2 is a block diagram illustrating a hardware configuration of the image forming apparatus 1. The image forming apparatus 1 includes the above-described toner cartridge 17C which is attachable to and detachable from the image forming apparatus 1. The toner cartridge 17C is an example of an exchange product that is mounted in the image forming apparatus 1. The exchange product will be described. The exchange product is a component that is attachable to and detachable from the image forming apparatus 1. The exchange product may be a component which is attachable to and detachable from the image forming apparatus 1, and may be a consumable product which is consumed with the lapse of time. The exchange product may be the toner cartridges 17M, 17Y and 17K, in addition to the toner cartridge 17C. The exchange product may be the drums 181C, 181M, 181Y and 181K, or may be the developing devices 183C, 183M, 183Y and 183K. The exchange product is not limited to the components of the image forming apparatus 1 which are illustrated here, and includes various components of the image forming apparatus 1. Here, the toner cartridge 17C will be described as an example of the exchange product.

The toner cartridge 17C includes a memory unit 171C. For example, the memory unit 171C is an integrated circuit (IC). The memory unit 171C is also referred to as a first memory unit. The memory unit 171C stores information indicating whether or not to be a genuine product, and first collation information.

The information indicating whether or not to be a genuine product will be described. The information indicating whether or not to be a genuine product is information which is assigned at the time of manufacturing the toner cartridge 17C. The image forming apparatus 1 determines whether or not the toner cartridge 17C is a genuine product, based on the information indicating whether or not to be a genuine product. The genuine product is capable of being also referred to as a non-pirated edition or an official product.

The first collation information will be described. The first collation information is information for determining whether or not the exchange product which is mounted in the image forming apparatus 1 is capable of being regarded as a genuine product. The first collation information is information that is changed with the lapse of time. For example, the first collation information is a count value or a time stamp of the total number of paper passing sheets up to the present time from initial installation of the image forming apparatus 1, but is not limited thereto. The first collation information may be a toner residual quantity. The first collation information may be a count value indicating the number of pixels that are printed by using the toner which is accommodated in the toner cartridge. The count value of the number of paper passing sheets, the toner residual quantity, and the count value indicating the number of pixels are counted or measured by a processor 101 which will be described later. The first collation information is updated at a predetermined timing by the processor 101 described later, and is stored in the memory unit 171C. For example, the predetermined timing is the timing of finishing a copy operation or the timing of finishing a print job operation, but is not limited thereto.

As illustrated in FIG. 2, the image forming apparatus 1 includes the processor 101, a read only memory (ROM) 102, a random access memory (RAM) 103, a memory device 104, an input unit 105, a display unit 106, and a communication unit 107.

The processor 101 controls each member of the image forming apparatus 1. For example, the processor 101 is a central processing unit (CPU). The processor 101 executes various processing by executing a program which is stored in the ROM 102 or the memory device 104.

The ROM 102 stores the program which is executed by the processor 101, control data, or the like. The RAM 103 is a working memory.

The memory device 104 is a nonvolatile memory which is rewritable. For example, the memory device 104 is formed of a solid state drive (SSD), a hard disk drive (HDD), or the like. The memory device 104 stores the program which is executed by the processor 101, the control data, and the like. The memory device 104 stores information that is collected by various processing of the processor 101.

The memory device 104 stores the second collation information. The memory device 104 is also referred to as a second memory unit. The second collation information will be described. The second collation information is information for being collated with the first collation information in order to determine whether or not the exchange product which is mounted in the image forming apparatus 1 is capable of being regarded as a genuine product. In the same manner as the first collation information, the second collation information is information that is changed with the lapse of time. In the same manner as the first collation information, the second collation information is updated by the processor 101 at every predetermined timing. Therefore, the first collation information which is stored in the memory unit 171C of the toner cartridge 17C is equal to the second collation information which is stored in the memory device 104.

The input unit 105 is an input device that receives an operation of a user. For example, the input unit 105 may be a keyboard, mouse, or a touch pad which is stacked on the display unit 106 described later.

The display unit 106 is a member that displays various information. For example, the display unit 106 may be a liquid crystal display.

The communication unit 107 is a member for communicating with the toner cartridge 17C. For example, the communication unit 107 is a reader-writer. The communication unit 107 is controlled by the processor 101, and is configured to write in the first collation information to the memory unit 171C. The communication unit 107 is an example of a write-in unit. The communication unit 107 writes in the first collation information that is equal to the second collation information which is stored in the memory device 104 by the processor 101 to the memory unit 171C, at a predetermined timing. The communication unit 107 may write in the first collation information as it is to the memory unit 171C, or may write in the second collation information which is encrypted by the processor 101 to the memory unit 171C. The communication unit 107 is configured to read out the first collation information from the memory unit 171C of the toner cartridge 17C. The communication unit 107 is configured to read out the information indicating whether or not to be a genuine product from the memory unit 171C of the toner cartridge 17C. The communication unit 107 is an example of a read-out unit. If the first collation information is encrypted, the first collation information may be decrypted by the processor 101.

Next, setting processing of the operation mode in the image forming apparatus 1 will be described. FIG. 3 is a flowchart illustrating the setting processing of the operation mode. In the processing illustrated in FIG. 3, a switch of an operation sequence, omission of the operation, or the like may be appropriately modified.

First, the processor 101 detects a power supply or a sleep return (Act 101). If the power supply or the sleep return is not detected (No in Act 101), the processor 101 is on standby until the power supply or the sleep return is detected. If the power supply or the sleep return is detected (Yes in Act 101), the processor 101 controls a state to read out the first collation information (Act 102). In Act 102, the processor 101 controls the communication unit 107 to read out the first collation information from the memory unit 171C of the toner cartridge 17C. The communication unit 107 reads out the first collation information from the memory unit 171C of the toner cartridge 17C which is mounted in the image forming apparatus 1, based on detection of the power supply or the sleep return.

The processor 101 reads out the second collation information (Act 103). In Act 103, the processor 101 reads out the second collation information from the memory device 104 which is provided with the image forming apparatus 1, based on the detection of the power supply or the sleep return.

The processor 101 compares the first collation information with the second collation information (Act 104). In Act 104, the processor 101 compares the first collation information with the second collation information based on the detection of the power supply or the sleep return. As illustrated by Act 105 to Act 110, the processor 101 sets the operation mode based on a comparison result of the first collation information with the second collation information. Here, if the toner cartridge 17C is mounted in the image forming apparatus 1 continuously before and after the predetermined timing described above, the first collation information is equal to the second collation information. On the other hand, for example, immediately after the toner cartridge 17C is exchanged, the first collation information is not equal to the second collation information. If the toner cartridge 17C is an unused product, there is a case where the memory unit 171C does not store the first collation information.

The processor 101 determines whether or not the first collation information is equal to the second collation information (Act 105). If the first collation information is equal to the second collation information (Yes in Act 105), the processor 101 sets the operation mode to be a first operation mode (Act 106). In Act 106, the processor 101 sets the operation mode to be the first operation mode, based on a comparison result indicating that the first collation information is equal to the second collation information. The first operation mode is an operation mode which is associated with a genuine product. The processor 101 is capable of executing a normal operation such as an image forming operation. In this manner, the processor 101 is capable of regarding the toner cartridge 17C as a genuine product based on the comparison result indicating that the first collation information is equal to the second collation information. The processor 101 is capable of simplifying a security check due to omission of genuine product determination processing based on the information indicating whether or not to be a genuine product.

If the first collation information is not equal to the second collation information (No in Act 105), the processor 101 controls the state to read out the information indicating whether or not to be a genuine product (Act 107). In Act 107, the processor 101 controls the communication unit 107 to read out the information indicating whether or not to be a genuine product from the memory unit 171C of the toner cartridge 17c. The communication unit 107 reads out the information indicating whether or not to be a genuine product from the memory unit 171C of the toner cartridge 17C, based on a comparison result indicating that the first collation information is not equal to the second collation information.

The processor 101 executes the genuine product determination processing (Act 108). In Act 108, the processor 101 determines whether or not the toner cartridge 17C is a genuine product based on the information indicating whether or not to be a genuine product. The processor 101 sets the operation mode to be any of the first operation mode and a second operation mode, based on a determination result indicating whether or not the toner cartridge 17C is the genuine product. The second operation mode is an operation mode which is associated with a non-genuine product. The non-genuine product is capable of being also referred to as a pirated edition or a non-official product.

If the toner cartridge 17C is the genuine product (Yes in Act 109), the processor 101 sets the operation mode to be the first operation mode (Act 105). In Act 105, the processor 101 sets the operation mode to be the first operation mode, based on a determination result indicating that the toner cartridge 17C is the genuine product. If the toner cartridge 17C is not the genuine product (No in Act 109), the processor 101 sets the operation mode to be the second operation mode (Act 110). In Act 110, the processor 101 sets the operation mode to be the second operation mode, based on a determination result indicating that the toner cartridge 17C is not the genuine product. Thereby, the processor 101 executes an operation which is different from an operation by the first operation mode. For example, the processor 101 is capable of setting the operation such as the image forming operation in prohibition, and causing a warning to be displayed on the display unit 106. The warning may be any as long as it notifies the user of the warning that the toner cartridge 17C is not the genuine product, and a content of the warning is not limited.

According to at least one embodiment, the image forming apparatus 1 is capable of reducing the waiting time up to a paper passing start, and realizing a quick booting, by simplifying the security check.

The image forming apparatus 1 is described as an example of an apparatus that forms a color image by including the toner cartridges 17C, 17M, 17Y and 17K, but is not limited thereto. The image forming apparatus 1 may be an apparatus that forms a black and white image by including the toner cartridge 17K.

The setting processing of the operation mode is described as an example of the toner cartridge 17C, but is not limited thereto. The image forming apparatus 1 is capable of applying the setting processing of the operation mode described above even to an exchange product which is different from the toner cartridge 17C.

It is preferable that the first collation information and the second collation information are configured to be smaller than the information indicating whether or not to be a genuine product in information quantity. By such a configuration, the time taken for comparison processing of the first collation information with the second collation information becomes shorter than the time taken for genuine product determination processing based on the information indicating whether or not to be a genuine product. The image forming apparatus 1 is capable of making the waiting time shorter than ever, by making the first collation information and the second collation information small in information quantity, in addition to the simplification of the security check.

The image forming apparatus 1 may use first collation information which is common to a plurality of exchange products. For example, the image forming apparatus 1 is capable of using the count value of the number of paper passing sheets as the first collation information which is common to the plurality of exchange products. The image forming apparatus 1 is capable of making the second collation information corresponding to the first collation information small in information quantity by commonizing the first collation information, thereby, simplifying the processing.

If the exchange product is the toner cartridge, the first collation information and the second collation information may be the count values indicating the number of pixels that are printed by using the toner which is accommodated in the toner cartridge. In this case, the first collation information and the second collation information vary in accordance with the toner cartridge of each color. Since the first collation information and the second collation information are information which is specific to the toner cartridge, reliability of the comparison processing of the first collation information with the second collation information is improved.

While certain embodiments have been described, these embodiments have been presented by way of example only, and are not intended to limit the scope of the inventions. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus comprising:
    a reader configured to read out at least one of first collation information or information indicating whether or not a product is a genuine product from a first memory of an exchange product which is mounted in the image forming apparatus;
    a second memory configured to store second collation information; and
    a processor configured to
        cause information generated by the image forming apparatus to be stored in the first memory of the exchange product as the first collation information, and cause information generated by the image forming apparatus to be stored in the second memory as the second collation information;
        detect a power supply or a sleep return;
        cause the reader to read out the first collation information;
        compare the first collation information with the second collation information based on detection of the power supply or the sleep return;
        set an operation mode to be any of a first operation mode associated with a genuine product or a second operation mode which is associated with a non-genuine product based on a comparison result of the first collation information with the second collation information;
        cause the reader to read out the information indicating whether or not a product is a genuine product from the first memory, to determine whether or not the exchange product is a genuine product based on the information indicating whether or not a product is a genuine product; and
        set the operation mode to be any of the first operation mode which is associated with a genuine product and the second operation mode which is associated with a non-genuine product, based on a determination result indicating whether or not the exchange product is a genuine product, the first collation information and the second collation information being smaller in quantity than information indicating whether or not the product is a genuine product.

2. The apparatus according to claim 1, wherein
the exchange product is a toner cartridge, and
the first collation information and the second collation information are count values indicating a number of pixels that are printed using toner accommodated in the toner cartridge.

3. The apparatus according to claim 1, wherein at least the first collation information changes over time.

4. An operation mode setting method comprising:
    detecting a power supply or a sleep return;
    reading out at least one of first collation information or information indicating whether or not a product is a genuine product from a first memory of an exchange product which is mounted in an image forming apparatus;
    reading out second collation information from a second memory which is provided with the image forming apparatus based on the detection of the power supply or the sleep return;
    causing information generated by the image forming apparatus to be stored in the first memory of the exchange product as the first collation information, and causing information generated by the image forming apparatus to be stored in the second memory as the second collation information;
    comparing the first collation information with the second collation information based on detection of the power supply or the sleep return;
    setting an operation mode to be any of a first operation mode associated with a genuine product or a second operation mode which is associated with a non-genuine product based on a comparison result of the first collation information with the second collation information;
    reading out the information indicating whether or not a product is a genuine product from the first memory, to determine whether or not the exchange product is a genuine product based on the information indicating whether or not a product is a genuine product; and setting the operation mode to be any of the first operation mode which is associated with a genuine product and the second operation mode which is associated with a non-genuine product, based on a determination result indicating whether or not the exchange product is a genuine product, the first collation information and the second collation information being smaller in quantity than information indicating whether or not the product is a genuine product.

5. The method according to claim 4, wherein the exchange product is a toner cartridge, and the first collation information and the second collation information are count values indicating a number of pixels that are printed by using toner accommodated in the toner cartridge.

6. The method according to claim 4, wherein at least the first collation information changes over time.

7. The method according to claim 4, wherein the first collation information and the second collation information vary in accordance with a plurality of colors of the exchange product.

8. The apparatus according to claim 1, wherein the information generated by the image forming apparatus includes a number of paper passing sheets.

9. The apparatus according to claim 1, wherein the information generated by the image forming apparatus includes a time stamp.

10. The apparatus according to claim 1, wherein the information generated by the image forming apparatus includes a quantity of residual toner.

11. The method according to claim 4, wherein the information generated by the image forming apparatus includes a number of paper passing sheets.

12. The method according to claim 4, wherein the information generated by the image forming apparatus includes a time stamp.

13. The method according to claim 4, wherein the information generated by the image forming apparatus includes a quantity of residual toner.

* * * * *